3,081,224
METHODS OF REMOVING HELMINTHS EMPLOYING HALOGENATED NITROPHENOLS AND THEIR DERIVATIVES
Ralph E. Thorson, Auburn, Ala., and Leon Goldman, Nanuet, and Wyeth S. Wallace and Anthony E. Lanziotti, Pearl River, N.Y., assignors to American Cyanamid Company, New York, N.Y., a corporation of Maine
No Drawing. Filed Jan. 21, 1959, Ser. No. 788,062
10 Claims. (Cl. 167—53)

This invention relates to a dosage unit form of certain halogenated nitrophenols useful as anthelmintics and particularly effective in domestic animals, such as dogs and sheep.

The compounds used in the present invention are included in the following general formula:

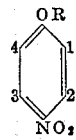

wherein R is a member of the group consisting of hydrogen, lower alkyl, aroyl, substituted aroyl, lower alkyl substituted carbamoyl, lower alkanoyl, lower alkylsulfonyl, arylsulfonyl, substituted arylsulfonyl, lower dialkyl thiophosphoryl and cation.

1=halogen or lower alkyl radicals
2=hydrogen or halogen
3=hydrogen or halogen
4=halogen, nitro or lower alkyl The compounds of the present invention may be used in two general ways, that is in a short therapeutic course, for example lasting for a single day, or as a longer maintenance or prophylatic diet lasting for a week or more. In the first case, the dose is from 0.5 to 200 mg./kg. body weight. In the second case, the range of dosage per day is half as great. The anthelmintic activity of the nitrophenol compounds of the present invention is quite specific. For example, closely related compounds which do not contain the phenolic phenol, ether or ester, such as 2,6-dichloro-4-nitrotoluene, 2,6-dichloro-4-nitroaniline, 2,6-dichloro-4-nitrobenzenethiol or 2,6-dichloro-4-nitrobenzoic acid are not effective.

Where R is a cation, it does not make any substantial difference whether the cation is hydrogen or a base strong enough to form a salt with a nitrophenol. The activity remains high and the choice is determined largely by the method of use of the compound. When R is hydrogen, the compounds are suitable for incorporation into the food of animals but if it is desired to inject the compounds, they are preferably injected in the form of their salts as these are more soluble and are sometimes more compatible with the animal tissue. Various salts can be used, such as alkali and alkaline earth metals or strong organic bases. Because of their cheapness, the sodium salts present some economic advantages and in some of the specific examples to follow, the sodium salts will be shown. However, the same results are obtainable with potassium salts or other salts of non-toxic bases and the invention is therefore not limited to any particular cation.

The compounds of the present invention have many advantages. The best of them are from twenty to forty times more effective than currently recommended compounds used in hookworm therapy. This permits much smaller amounts to be used, and at therapeutic levels all of the compounds are well tolerated. Another advantage is that the compounds are quite stable to heat which makes it possible to use them as additives to feeds in which heat is used in the production process.

The daily doses set out above may be given in the form of one or more oral doses or they may be mixed with the animal feed, in which case concentrations of from 0.001 to 0.1% are useful. It is also possible to introduce the medicament by injection, for example intraperitoneally, in the same doses as by the oral route.

Another advantage of the present invention is that the dosage units are quite effective against the particularly common infection, such as *Ancylostoma caninum* in the case of dogs or *Haemonchus contortus*, in the case of sheep. With sheep, another method of introducing the medicament is often desirable, namely an 0.5% agar drench. For oral use, the compounds are equally effective in capsule or tablet forms and are usually mixed with sufficient excipient to make for convenient tabletting or capsule feeding.

The invention will be described in greater detail in conjunction with the following specific examples.

EXAMPLE 1

Street dogs, six weeks to six months old, were experimentally infected with 100–200 infective larvae of *Ancylostoma caninum*. Twenty-eight to thirty days later, the number of hookworm eggs in a two day pooled sample of feces was determined using a modification of the Stoll dilution technique. If the egg count was considered high enough to be useable, the dog was dosed four days later with a compound orally in gelatin capsules or in canned meat type dog food. If multiple dosing was used, this was repeated for as many as seven days by either method.

Compounds were given on an mg./kg. basis. One week later, a pooled two day fecal sample was again checked by the Stoll dilution technique. A drop in egg count of 80% to 90% which persisted for an additional week and a subsequent 80% to 90% reduction in adult worms at necropsy were considered evidence of activity. When no controls were available, estimates of worm burdens in dogs (infected for four to eight weeks) indicate that a ratio of approximately one worm to 100 eggs per gram was conservative. In the tables, a small "e" indicates that the percentage reduction in worms was estimated on this basis.

Lambs were also experimentally infected with the stomach worms *Haemonchus contortus*. Stoll counts of feces samples taken from the rectum before and after treatment were used to determine the effect of these compounds on the infections. A drop of 80% to 90% in egg count and a subsequent drop in numbers of adults at necropsy were the criteria of activity. The compounds were administered to sheep in an 0.5% agar drench.

The following table shows the approximate minimum effective dose for dogs of a number of typical compounds:

Table I

| R | Benzene Ring Substituents | | | | Activity, mg./kg. body wt. |
|---|---|---|---|---|---|
| | 1 | 2 | 3 | 4 | |
| H | I | H | H | I | 5 |
| Na | I | H | H | I | 5 |
| H | Br | H | H | Br | 5 |
| H | Cl | H | H | Cl | 10 |
| H | Cl | H | H | $NO_2$ | 25 |
| H | $CH_3$ | H | H | $NO_2$ | 25 |
| $CH_3$ | Cl | H | H | Cl | 10 |
| $CH_3$ | Br | H | H | Br | 10 |
| $CH_3$ | Cl | Cl | Cl | Cl | 10 |
| $CH_3$ | I | H | H | I | 25 |
| $C_2H_5$ | Cl | H | H | Cl | 10 |
| $COCH_3$ | Br | H | H | Br | 80 |
| $COCH_3$ | Cl | H | H | Cl | 25 |
| $COCH_3$ | I | H | H | I | 25 |
| $COC_6H_5$ | Cl | H | H | Cl | 50 |
| $CON(CH_3)_2$ | Cl | H | H | Cl | 50 |
| $CON(C_2H_5)_2$ | Cl | H | H | Cl | 25 |
| $SO_2CH_3$ | Cl | H | H | Cl | 100 |
| $SO_2C_6H_5$ | Cl | H | H | Cl | 25 |
| $P(S)(OC_2H_5)_2$ | Cl | H | H | Cl | 25 |

EXAMPLE 2

Multiple doses of some of the compounds in canned dog food were given to dogs for seven days, once daily. The results are shown in Table II.

Table II

| Compound | MED, mg./kg. O.D.×7 | Average Relative Activities |
|---|---|---|
| 2,6-diiodo-4-nitrophenol | 1–2.5 | 1 |
| 2,6-dichloro-4-nitrophenol | 2.5–5.0 | 0.5 |
| 2,6-dichloro-4-nitroanisole | 2.5–5.0 | 0.5 |
| 2,6-dichloro-4-nitrophenyl acetate | 10 | 0.1–0.25 |

MED = Minimum effective dose.
O.D. = Once daily.

EXAMPLE 3

Various doses of 2,6-diiodo-4-nitrophenol were used in a single dose in puppies infected with hookworm as described in Example 1. The results are shown in Table III.

Table III

| Dose, mg./kg. Single dose | Eggs per gram of feces (in 100's) | | Percent Reduction | Adults at necropsy | Percent Reduction |
|---|---|---|---|---|---|
| | Pretreatment | Post treatment | | | |
| 10 | 63 | 0 | 100 | 0 | 100 |
| 5 | 58 | 0 | 100 | 0 | 100 |
| 5 | 53 | 1 | 98 | 1 | [1] 98 |
| 2.5 | 45 | 4 | 91 | 13 | [1] 71 |

[1] Estimated.

EXAMPLE 4

The 2,6-diiodo-4-nitrophenol of the preceding example was used with puppies on a repeated daily dosage basis for seven days. The puppies were infected as described in conjunction with Example 1 and some of the puppies were not fed any drug and therefore acted as controls. Table IV shows that in the case of the controls, there was an excellent growth of adult worms whereas the 2.5 mg./kg. dosage resulted in no adult worms.

Table IV

| Number of Dogs | Dose, mg./kg. for 7 days | Median, Eggs/gram of feces (in 100's) (Range) | | Adults at Necropsy | Percent Reduction |
|---|---|---|---|---|---|
| | | Pre-treatment | Post treatment | | |
| 4 | 2.5 | 64 (36–155) | 0 (0–1) | 0 | 100 |
| 4 | | 75 (43–146) | 39 (21–115) | 73 (58–112) | |

We claim:

1. A method of removing helminths from domestic animals which comprises administering to said animals an anthelmintic composition comprising a carrier and from 0.25 to 200 mg. per kg. based on the body weight of said animal, of a compound represented by the formula:

$$\begin{array}{c} OR \\ (4)-\!\!\!\!\bigcirc\!\!\!\!-(1) \\ (3)-\!\!\!\!\bigcirc\!\!\!\!-(2) \\ NO_2 \end{array}$$

wherein R is selected from the group consisting of hydrogen, lower alkyl, benzoyl, dilower alkyl carbamyl, lower alkanoyl, methylsulfonyl, phenylsulfonyl, lower dialkyl thiophosphoryl, alkali metal and alkaline earth metal, (1) is a member of the group consisting of halogen and lower alkyl radicals, (2) and (3) are members of the group consisting of hydrogen and halogen atoms and (4) is a member of the group consisting of halogen, lower alkyl and nitro radicals.

2. The method of claim 1 in which the compounds are those wherein (1) and (4) are halogen, (2) and (3) are hydrogen and R is $C_nH_{2n+1}$ wherein $n$ is an integer more than one and less than seven.

3. The method of claim 1 in which the compound is O-(2,6-dichloro-4-nitrophenyl)O,O-diethylphosphorothioate.

4. The method of claim 1 in which the compound is 2,6-diiodo-4-nitrophenol.

5. The method of claim 1 in which the compound is sodium-2,6-diiodo-4-nitrophenolate.

6. The method of claim 1 in which the compound is 2,6-dibromo-4-nitrophenol.

7. The method of claim 1 in which the compound is 2,6-dichloro-4-nitrophenol.

8. The method of claim 1 in which the compound is 2,6-dichloro-4-nitroanisole.

9. The method of claim 1 in which the compound is 2,6-dichloro-4-nitrophenetole.

10. The method of claim 1 in which the compound is 2,3,5,6-tetrachloro-4-nitroanisole.

References Cited in the file of this patent

Chem. Abst. Formula Index, 1920–1946, p. 160 (col. 1).
Chem. Abst. Subject Index, vol. 26, 1932, p. 7853.
Chem. Abst. Subject Index, vol. 41, 1947, p. 8254.
Chem. Abst., vol. 45, 1951, p. 5185a.
Chem. Abst., vol. 50, 1956, pp. 1806s (under 2,4-dinitro phenol; as anthelmintic) and 10987d.
Chem. Abst. Subject Index, vol. 51, 1957, pp. 1789S–1790S.
Mackie: J. Pharm. and Pharmacol., vol. 7, No. 6, June 1955, pp. 416 and 417.
Watkins: J. Pharmacy and Pharmacology, vol. 10, No. 4, April 1958, pp. 209–211.
U.S. Dispensatory, 25th ed., 1955, p. 1910.